April 16, 1963 J. A. FINNEY, JR., ETAL 3,085,382
MULTI-TUBE CENTRIFUGAL SEPARATORS
Filed Jan. 3, 1961 2 Sheets-Sheet 1
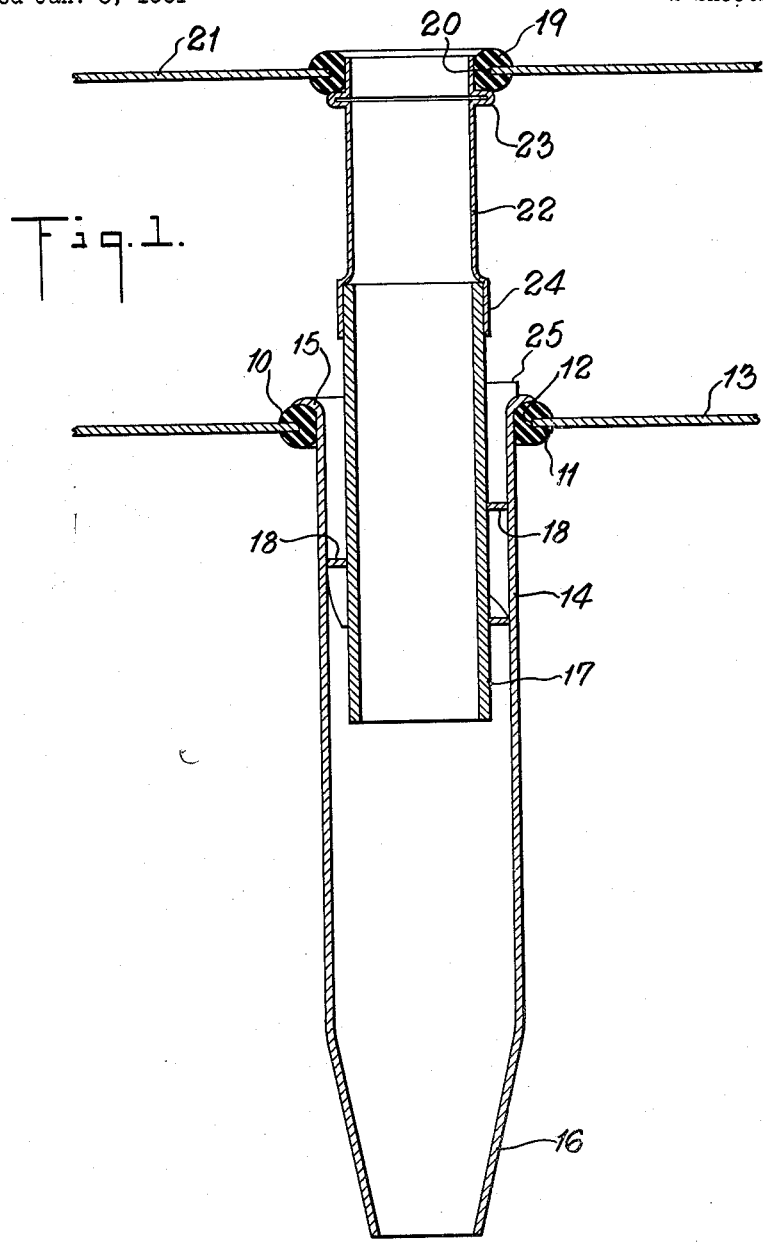
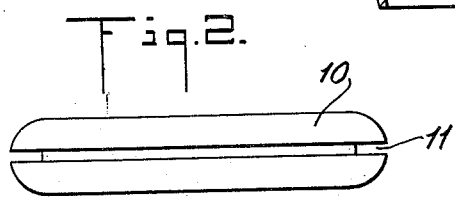
INVENTORS
JAMES A. FINNEY, JR
HOMER G. SHATTUCK
BY
Benj. T. Rauber
ATTORNEY

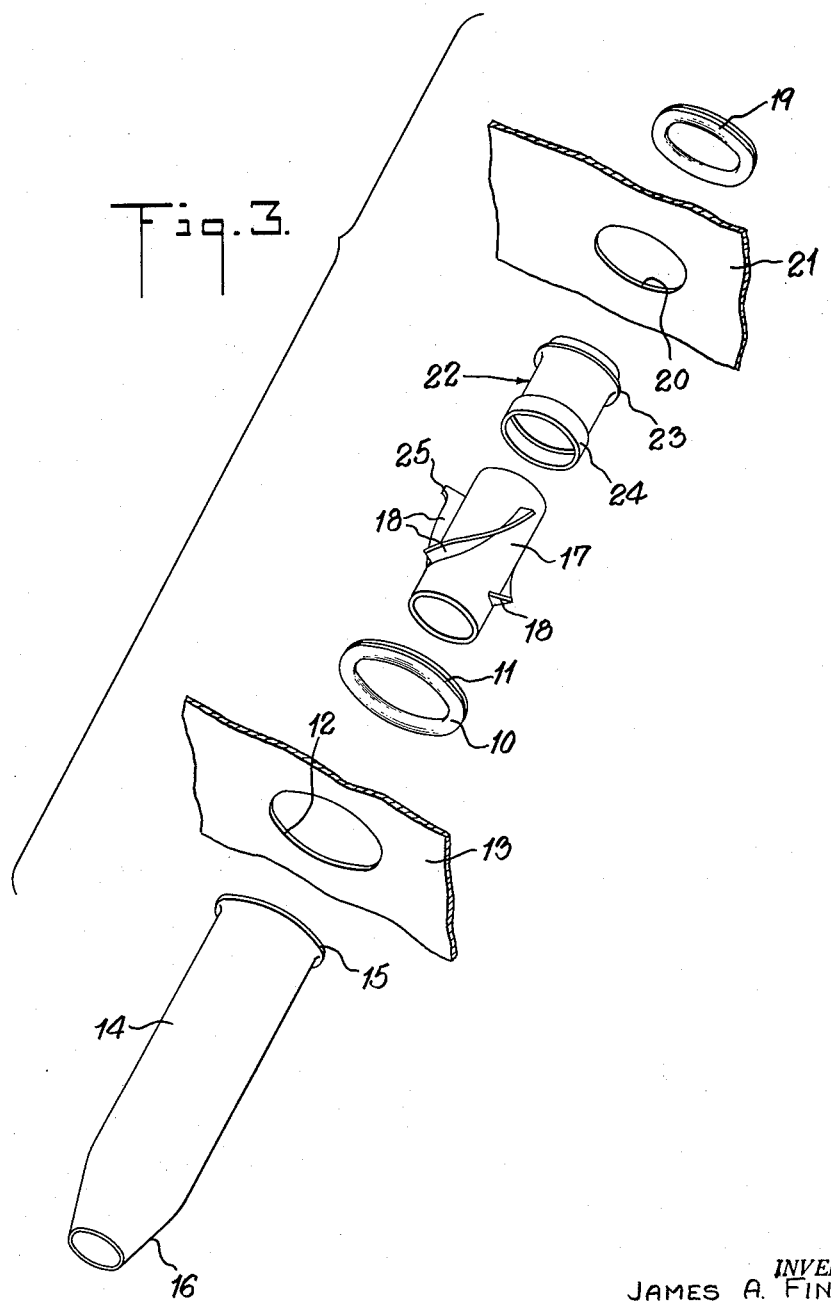

3,085,382
    MULTI-TUBE CENTRIFUGAL SEPARATORS
James A. Finney, Jr., Greenwich, Conn., and Homer G.
  Shattuck, Rye, N.Y., assignors to Aerotec Industries,
  Inc., Greenwich, Conn., a corporation of Connecticut
           Filed Jan. 3, 1961, Ser. No. 80,242
                  8 Claims. (Cl. 55—449)

Our invention relates to multi-tube centrifugal separators for separating suspended particles from gases and, more particularly, to means for mounting the centrifugal tubes in a tube sheet of the apparatus.

In multi-tube centrifugal separators, a housing containing the separators is divided by partitions or tube sheets into a plenum chamber into which dust laden air or gas is admitted, a collecting chamber to receive particles separated from the gas and an off-take chamber to receive the cleaned gas. The several centrifugal tubes are mounted in the tube sheet dividing the plenum chamber from the collecting or dust chamber in such manner that dust or particle laden gases pass from the plenum chamber into the tubes with a rotary movement to separate centrifugally the suspended particles from the gas. The particles, of solids or liquid, are thus thrown outwardly to the inner surface of the respective tubes and pass, by gravity or by the momentum of their movement, longitudinally of the tube and through the end opening into the collecting or dust chamber. The cleaned gas in the central part of the tube reverses its axial movement and passes through the open end of an off-take pipe extending co-axially of the tube into the off-take chamber.

The housing and partitions or tube sheets are constructed of metal, such as steel or a ferrous alloy as are also the centrifugal tubes. The tube sheet in which the tubes are mounted may be either horizontal, in which case the tubes depend in a vertical direction, or may be vertical, in which case the tubes may be horizontal or downwardly inclined as space or other conditions require. The tube sheets may, if necessary, be inclined.

It is necessary that the tubes be held in openings in the tube sheet by a firm, leak-proof seal, so that the tubes may be firmly and securely held and shall not permit leakage of gas through the joint from the plenum chamber into the dust or collecting chamber as this would interfere with the efficient operation of the apparatus. Tubes may range in size from a diameter of about four inches or more to a diameter of about one inch and, being of metal and subject to gravitational and other forces must be joined in the tube sheet to form a strong joint sufficient to withstand the forces involved.

Heretofore this mounting of the tubes in the tube sheets has been obtained by rolling the tubes into tight engagement with the edges of the openings in the tube sheet in which they are mounted or by welding so that the tubes can not be displaced or removed without cutting them away from the tube sheet.

The tubes are subject to wear, erosion by particles or corrosive liquids thrown centrifugally against the inner surface of the tubes or from other causes. This necessitates occasional removal and replacement of the tubes. The removal of the tubes mounted in tube sheets in the manner heretofore used is extremely difficult owing to the autogenous or gripping union of the tube and tube sheet as outlined above. This difficulty is enhanced by the restricted space in the plenum chamber where the tubes are mounted due to limitations in the space available in industrial plants and power stations for dust collecting apparatus.

Our invention provides a mounting of the tubes in a tube sheet which obviates the difficulties and disadvantages of the above construction and which has other advantages over such prior art constructions. We have discovered that by the use of elastomers of sufficient hardness and resilience the tubes may be mounted in tube sheets either in a depending position from a horizontal tube sheet or as horizontal or downwardly inclined tubes in a vertical tube sheet. In either position the elastomeric mounting is adequate to withstand the weight of the projecting tube or of other forces acting on it.

In our invention we mount in each opening of the tube sheet a ring of an elastomer, the ring having a circumferential groove in its outer periphery to receive the margin of the tube sheet about the opening. The groove is of a width to form a tight fit against the surface of the tube sheet about the opening and the diameter of the bottom of the groove is preferably slightly greater than the diameter of the tube sheet opening so that when the ring is set into the opening, it will be under a compressive stress which causes a rigid, air-tight, mounting of the tube in the tube sheet.

The inner periphery of the elastomer ring is of slightly less diameter than that of the tube so that when the tube is inserted into the ring it compresses the elastomer between the tube and the edge of the hole in the tube sheet. This not only holds the tube sheet rigidly and tightly but also permits relative expansion and contraction of the tube and tube sheet under changes in temperature or other causes without imposing stresses on any metal part of the apparatus the stresses being taken by the elastomer.

The elastomer may be of any composition having suitable hardness and resilience. Hard vulcanized rubber (not ebonite) may be used, particularly for temperatures below the vulcanizing or softening temperature. Synthetic rubbers or other synthetic elastomers may be used to suit temperature or other conditions of use. A vulcanized rubber composition such as that used in the treads of pneumatic tires is adequate for separators operating at normal temperatures. The mounting of our invention may also be used for the off-take pipe.

The invention is illustrated by way of example in the accompanying drawing, in which, FIG. 1 is a vertical, longitudinal, section of an assembly of tube sheet, centrifugal tube, off-take pipe and sealing and mounting rings, FIG. 2 is an edge view of the sealing and mounting ring, and FIG. 3 is an exploded view on the several parts of the assembly shown spaced from their assembled positions.

In the embodiment of the invention shown in the accompanying drawings, a sealing ring 10 of elastomeric material, such as hard vulcanized rubber, is provided with a peripheral groove 11 extending radially inwardly and of dimensions to receive and grip the marginal edge about an opening 12 in a tube sheet 13. The ring may be mounted in the opening 12 by collapsing or bending it radially inwardly, placing the groove 11 in the plane of the tube sheet in the opening 12 and releasing the ring. The ring will then expand into place with the marginal edge of the opening gripped fluid tightly in the groove. The ring 10 may be of any suitable cross section, the ring shown in the drawings being of a generally torus shape.

When the ring 10 is mounted in the tube sheet opening, a tube 14 is inserted through the ring until a rounded flange 15 at the inlet end of the tube abuts the surface of the ring. The external diameter of the tube is preferably slightly larger than the internal diameter of the ring so as to compress the ring slightly to form a fluid tight seal and to insure the ring being forced outwardly against the edge of the opening 12 and to force the sides of the groove more tightly against the marginal portion of the tube sheet about the opening. The tube 14 is of the type having a contracted delivery end 16.

When the tube is thus mounted in the tube sheet, an off-take pipe 17 having spiral deflecting vanes 18 is inserted into the inlet end of the tube to form a helical path for the incoming dust laden air. The vanes fit the inner surface of the tube and thus serve to center the off-take pipe in the tube. The off-take pipe and vanes may be of a hard elastomer of the same type as the ring 10.

In a similar manner an extension of the off-take pipe 17 may be mounted in a tube sheet parallel to the tube sheet 13. For this purpose, a ring 19 of an elastomer similar to that of the ring 10 and having a peripheral groove similar to that of the ring 10 is similarly mounted in an opening 20 in an off-take tube sheet 21, the opening 20 being co-axial with the tube 14. The off-take pipe extension may be similar to the construction of the tube 14 but in the embodiment illustrated comprises a pipe 22 having an external flange 23 spaced slightly from the upper or outlet end and enlarged at its lower or inlet end as at 24 to fit over the upper end of the off-take pipe 17.

The extension 22 is mounted in the ring 19 by inserting in its upper or outer end therein until the flange 23 abuts the lower surface of the ring 19. When the tube sheet 21 is placed in position above the tube sheet 13 with the tube 14 and extension co-axial, the extension will fit about the upper end of the off-take pipe 17, forming an air tight connection. The vanes 18 may be widened at their upper ends as at 25 to rest on the upper surface of the ring 10 and support the off-take pipe 17 in position. The arrangement of the off-take pipe extension illustrated prevents any upward displacement of the off-take pipe.

In the above description the invention has been illustrated in connection with an embodiment in which the tubes, tube 14 and off-take pipe 22, are arranged at approximately a right angle to the plane of the tube sheets 13 and 20. This has been done merely by way of example and it is to be understood that the tubes may be mounted at an angle other than 90°, the tube sheets 13 and 21 being, or the openings therethrough being modified in known manner for this purpose.

With the above invention the tube and off-take pipe may be easily and quickly mounted in their respective tube sheets and may be easily replaced when worn. The hard elastomer rings insure a gas tight seal and hold the tubes firmly in position and absorb the stresses which may be imposed on them by the weight of the tubes or by other circumstances. A number of pairs of tubes and off-take pipes may be mounted in the tube sheets.

Having described our invention, we claim:

1. In a centrifugal separator, a tube sheet having a circular hole, a ring of a hard elastomer composition mounted in said hole and having a circumferential groove extending inwardly from the outer periphery of said ring and fitting the margin of said tube sheet about said hole, and a centrifugal separator tube mounted in and compressing said ring and held by said ring rigidly and fluid tightly in said tube.

2. The apparatus of claim 1 in which the outer diameter of the tube is greater than the unstressed inner diameter of the ring.

3. The apparatus of claim 1 in which said tube has an outwardly flanged end to rest against the surface of the ring.

4. The apparatus of claim 1 in which said tube is of metal.

5. The apparatus of claim 1 having an off-take pipe co-axial with the tube and projecting into one end thereof to form an annular space between the pipe and tube, and a helical vane spanning said annular space.

6. The apparatus of claim 1 having a second tube sheet spaced from said first tube sheet and from the inlet end of said tube and having a hole coaxial with the hole in said tube sheet, a ring of a hard elastomer composition in the hole of the second tube sheet and having a circumferential groove in its outer periphery tightly engaging the hole in said second tube sheet and the margin about said hole, an off-take pipe supported in said ring in said second tube sheet and compressing said ring and extending co-axially into said tube to form an annular passage therein and deflecting vanes on said off-take pipe in said annular space.

7. The apparatus of claim 6 in which said deflecting vanes are widened at the entrance end of said annular space to rest on said tube.

8. The apparatus of claim 6 in which said pipe has an outwardly extending flange abutting said elastomer ring in said second tube sheet.

References Cited in the file of this patent

UNITED STATES PATENTS

| | | |
|---|---|---|
| 2,323,708 | Danz | July 6, 1943 |
| 2,433,774 | Madely | Dec. 30, 1947 |
| 2,438,827 | Shoffner | Mar. 30, 1948 |
| 2,451,699 | Twaroski | Oct. 19, 1948 |
| 2,773,598 | Castellani | Dec. 11, 1956 |
| 2,995,207 | Brandt | Aug. 8, 1961 |

FOREIGN PATENTS

| | | |
|---|---|---|
| 722,445 | Great Britain | Jan. 26, 1955 |
| 763,685 | Great Britain | Dec. 12, 1956 |
| 1,016,543 | Germany | Sept. 26, 1957 |